United States Patent

Ryan et al.

[15] 3,654,555

[45] Apr. 4, 1972

[54] CARRIER AND TONE SQUELCH CIRCUIT WITH ELIMINATION OF NOISE AT END OF TRANSMISSION

[72] Inventors: George H. Ryan, Crystal Lake; Ross W. Randolph, McHenry, both of Ill.

[73] Assignee: Motorola, Inc., Franklin Park, Ill.

[22] Filed: Aug. 19, 1970

[21] Appl. No.: 65,089

[52] U.S. Cl. ............................................325/348, 325/478

[51] Int. Cl. ........................................................H04b 1/10

[58] Field of Search ..................................325/478, 64, 348

[56] References Cited

UNITED STATES PATENTS

| | | | |
|---|---|---|---|
| 3,584,304 | 6/1971 | Casterline et al. | 325/478 |
| 3,092,772 | 6/1963 | Dalton et al. | 325/478 X |
| 3,250,999 | 5/1966 | Cole | 325/478 X |
| 3,397,401 | 8/1968 | Winterbottom | 325/64 X |
| 3,496,467 | 2/1970 | Lundgren | 325/64 X |

*Primary Examiner*—Robert L. Richardson
*Attorney*—Mueller & Aichele

[57] ABSTRACT

Squelch circuit for radio receiver operating in response to a carrier wave and in response to a coded tone, and wherein a reverse burst is used at the end of the tone to rapidly stop the resonant device. The circuit responding to the tone is coupled to the carrier squelch circuit and holds the same inoperative for a short period of time following the tone, to eliminate the noise burst which otherwise occurs.

8 Claims, 2 Drawing Figures

INVENTOR
GEORGE H. RYAN
BY Mueller + Aichele
ATTYS.

CARRIER AND TONE SQUELCH CIRCUIT WITH ELIMINATION OF NOISE AT END OF TRANSMISSION

BACKGROUND OF THE INVENTION

This invention relates to a squelch circuit for a radio receiver which responds to a coded tone and to a received carrier wave, and particularly to such a circuit which holds the receiver audio squelched for a time after the termination of the coded tone to eliminate the squelch tail.

This application is related to prior U.S. Pat. No. 3,584,304 issued June 8, 1972, to Burnham Casterline and Ronald H. Chapman, and assigned to Motorola, Inc., assignee of this application. The squelch system of the present application has been found to provide improved performance in certain application.

In communications frequency modulation receivers, it is common practice to provide a squelch system which reduces the audio stages of the receiver inoperative except for signals intended for the particular receiver. The squelch system may include a carrier operated circuit which causes the audio to be rendered operative only when a carrier wave is received, and a tone coded squelch system which responds to a tone of a particular frequency accompanying the transmission to render the receiver operative. In such receivers, the action of the carrier squelch circuit is delayed and at the termination of a transmission the receiver is unsquelched so that an annoying noise burst or squelch tail is heard. When using the tone coded squelch circuit, the noise burst or squelch tail can be eliminated by continuing the carrier for a short period of time after the code tone stops. By this action, the receiver is squelched before the carrier ceases and no annoying noise burst is reproduced.

The FCC requires that communications systems operators listen to the communication channel which a transmission is to be initiated before transmitting, to prevent interference between transmission on the same channel. To accomplish this the squelch system must be rendered operative in the carrier squelch mode before the operator initiates a transmission, so that he can hear other transmissions on the channel. This requires the carrier squelch circuit to be operative, with the results that the objectionable squelch tail is purchased even though coded tone squelch signals are available to eliminate this disturbance.

SUMMARY OF THE INVENTION

It is an object of this invention to provide an improved squelch system for an FM communications receiver wherein the squelch tail is eliminated.

Another object of the invention is to provide a squelch system providing coded tone and carrier squelch operation wherein a control signal from the tone squelch circuit disables the carrier squelch circuit for a period of time following termination of the tone.

A further object of the invention is to provide a combined carrier squelch and coded tone squelch system wherein the tone squelch circuit responds to a reverse burst of tone to rapidly turn off the audio and the carrier continues to transmit the reverse burst, wherein the carrier squelch circuit is rendered inoperative following the tone for a period of time to prevent a noise burst or squelch tail from being reproduced.

In practicing this invention, a combined carrier squelch and tone coded squelch system is provided for a frequency modulation communications receiver, including a carrier squelch circuit which responds to noise in the absence of a carrier wave to disable the receiver audio stages. The presence of a carrier wave reduces the noise and provides an enabling signal to the audio amplifier. The tone squelch circuit includes a continuously running oscillator which provides tone for transmission and which responds to received tone to increase the amplitude of oscillations above a threshold so that an output is produced by a tone detector. This provides an enabling voltage to the audio amplifier to render it operative.

For tone coded squelch operation, at the end of a transmission a reverse burst of the tone is transmitted to rapidly terminate the operation of the mechanically resonant device. This requires continued transmission of the carrier wave which will hold the carrier squelch circuit open so that the noise at the end of the transmission is reproduced. The circuit of the invention includes a memory capacitor which controls a circuit disabling the carrier squelch circuit so that it cannot enable the audio for a period following the termination of the tone.

DETAILED DESCRIPTION

Figure 1:
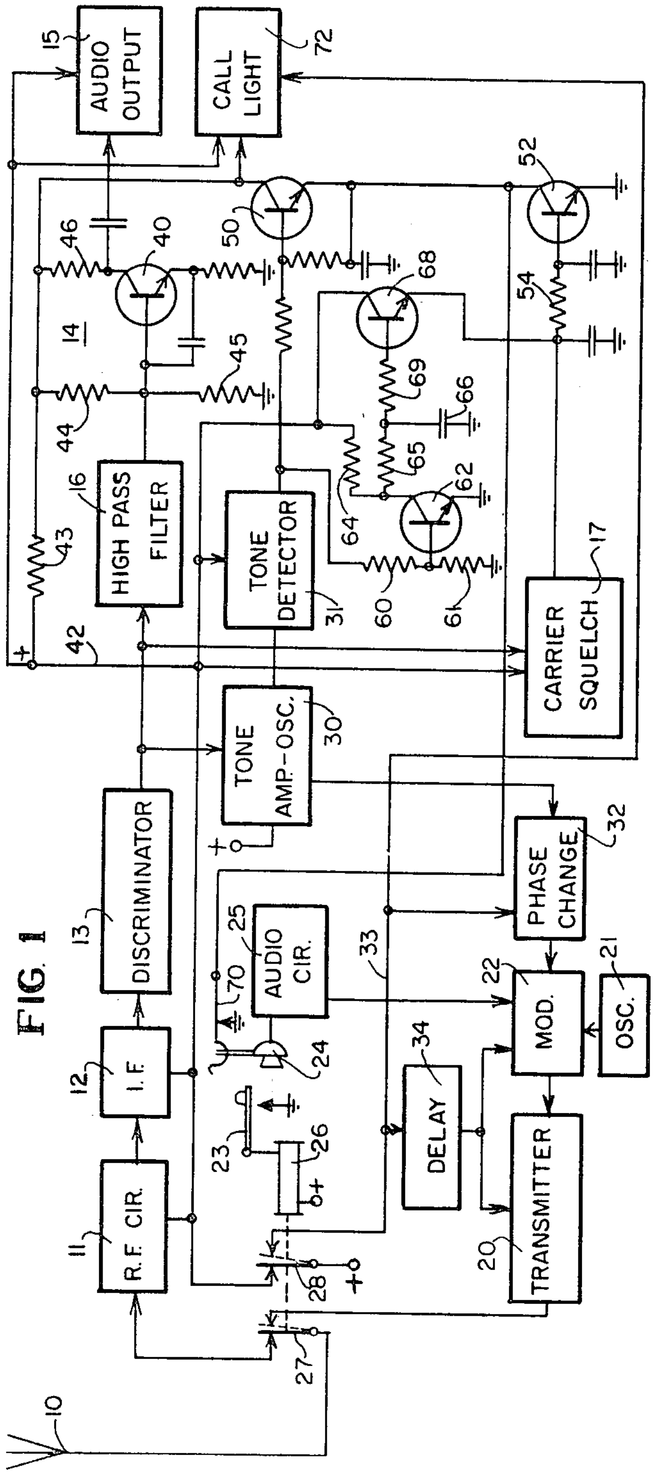
FIG. 1 is a partial block and partial schematic diagram of two-way radio apparatus including a receiver with the squelch system of the invention.

FIG. 1 illustrates a two-way radio transmitter and receiver wherein the receiver includes the squelch system of the invention. Signals received by antenna 10 are applied to radio frequency circuit 11, which may include selectively tuned circuits and frequency conversion circuits to reduce the frequency of the received wave. Intermediate frequency signals are simplified in amplifier 12 and applied to discriminator 13 wherein the modulation is derive from the received waves. Audio signals are applied from the discriminator through high pass filter 16 to a controlable audio amplifier 14, and from the audio amplifier 14 to the audio output stages 15 which may include a sound reproducing device. The filter 16 passes audio frequencies but attenuates tones having frequencies under 300 hertz which are used for tone coded squelch operation. A carrier squelch circuit 17 is coupled to the output of the discriminator to control the audio stages, so that noise produced in the absence of a carrier wave is not reproduced. Such circuits are well known in the art.

The two-way radio also includes a transmitter 20 which may apply signals for transmission to the antenna 10. A relay 26 has a contact 27 which selectively connects the antenna to the receiver circuit 11 and the the transmitter 20. THe carrier wave which is transmitted is developed by an oscillator 21 and applied to modulator 22. Audio signals from microphone 24 are applied through audio circuit 25 to the modulator 22 for modulating the carrier wave. Associated with the microphone 24 is a push-to-talk switch 23 which is operated during a transmission to control the relay 26. The relay 26, in addition to switching the antenna between the receiver and transmitter, is also illustrated as having a contact 28 for selectively applying power to the receiver and transmitter circuits. It is pointed out that other switching means, such as a semiconductor switching circuit, can be used for this purpose. In the position shown in solid lines, the receiver circuit positions are energized, and in the actuated position shown in dotted lines, the transmitter portions are energized.

In addition to the carrier squelch circuit 17, the two-way equipment includes provisions for tone coded squelch operation. For such operation, a tone amplifier and oscillator circuit 30 and tone detector 31 are provided. These elements may be in accordance with the circuit described in application Ser. No. 790,262, filed Jan. 10, 1969, by Kenneth P. Lundgren, now U.S. Pat. No. 3,584,302. This circuit provides low level tone oscillations which are applied through the phase change circuit 32 to the modulator 22 of the transmitter. The tone is transmitted to provide selective operation of a receiver with which the transmitter communicates. Received tone signals from the discriminator 13 are applied to the tone amplifier oscillator circuit 30 and received signals of the frequency of the oscillator increase the amplitude of the oscillations in circuit 30. The tone detector 31 responds to oscillations exceeding a predetermined threshold amplitude to provide a squelch control signal. Accordingly, received tone signals will cause the amplitude of oscillations to exceed the threshold, and the tone detector 31 will produce an output which controls the audio circuit of the receiver.

It is common practice to provide a mechanically resonant device in the tone oscillator and selecting circuits used for tone coded squelch operation. These have the disadvantage that when the tone terminates, although the amplitude of the mechanically resonant device decays, it continues to vibrate for a time which may be as long as 2 seconds. To speed up the decay of the vibrations, the tone may be applied to the device with a phase to oppose the vibrations. A system providing the phase changed tone oscillations and transmitting the same to rapidly stop the mechanically vibrating device is described in U.S. Pat. No. 2,974,221.

In the system of FIG. 1, to provide the phase change of the tone at the end of a transmission, the oscillations from the tone oscillator 30 are applied through phase change circuit 32. This circuit is connected to the line 33 which is energized as a result of operation of the push-to-talk switch 23 when the transmitter is operated. The phase change circuit operates when the potential is removed from line 33 to change the phase of the oscillations applied to the modulator 22. The energization of the transmitter 20 and modulator 22 is continued for a period of time after the push-to-talk switch is released by operation of the delay circuit 34. Accordingly, the transmitter will transmit the phase changed oscillations to the receiver with which it is communicating.

Considering now the operation of the audio stage 14, this stage includes a transistor 40, with the audio signals from the discriminator 13 being applied to the base thereof. The transistor 40 amplifies the audio signals and they are applied from the collector of this transistor to the audio output stage 15. Energizing potential for the receiver is applied from the positive supply through relay contact 28 to conductor 42. This potential is divided by resistors 43, 44 and 45 to provide a bias potential for the base of transistor 40, and is applied through resistors 43 and 46 to the collector of transistor 40. Connected to the junction of resistors 43 and 44 is a circuit including the collector to emitter path of transistor 50 and the collector to emitter path of transistor 52. When the transistor 50 and 52 are both conducting, the potential at the junction of resistors 43 and 44 is brought to a level just slightly above ground. This removes the energizing potential from transistor 40 to render the same nonconducting and interrupt the audio signals being applied to the audio output 15.

The transistor 50 is coupled to the tone coded squelch circuit, and is normally conducting, as a voltage of the order of 2 volts or more is applied thereto from the tone detector 31 in the absence of a received tone signal. When a tone signal of the frequency to which the circuit 30 responds is received, the output of the tone detector 31 drops to a voltage of the order of 0.7 volts. This renders the transistor 50 nonconducting to open the circuit grounding the supply to transistor 40. Accordingly, energizing potential is applied to this transistor so that it conducts to amplify the audio signal and apply the same to audio output 15.

As previously stated, the carrier squelch circuit 17 responds to noise, and in the absence of a carrier, a voltage is produced by this circuit which is applied through the filter 54 to the base of transistor 52. This causes the transistor 52 to conduct to complete the path extending from the unction of resistors 43 and 44 through transistor 50 to ground. When there is no tone, transistor 50 conducts, and when there is no carrier, the noise causes transistor 52 to conduct. This completes the shunt path to ground to effectively remove the energizing potential from transistor 40 to render it nonconducting. When a carrier wave is received, the noise applied to the carrier squelch circuit will reduce. This will cause the noise voltage at the output of the carrier squelch 17 to drop and this reduced voltage is applied to the base of transistor 52 to cause transistor 52 to be rendered nonconductive. This opens the shunt path to ground so that the energizing potential is applied to transistor 40 and it is rendered operative. Accordingly, either the presence of the tone, or the presence of a carrier, will open the shunting circuit so that the audio signal is reproduced.

In order to provide squelch operation, the action of the carrier squelch circuit of the dual squelch system is delayed in its operation. Therefore, upon termination of the carrier wave, the carrier squelch circuit 17 will hold the transistor 52 nonconducting for a short period of time so that the audio transistor 40 will be operative to amplify noise then produced by the receiver. To prevent this action, a circuit is provided coupling the tone detector 31 to the input to the carrier squelch control transistor 52. The output of the tone detector 31 is applied through the voltage divider including resistors 60 and 61 to the base of transistor 62. Transistor 62 is normally conducting so that its collector is near ground potential. When the tone is received, transistor 62 is rendered nonconducting its and this allows the collector to rise substantially to the supply potential. During such operation, the supply potential applied through resistors 64 and 65 charges capacitor 66. Transistor 68 has its base electrode connected through resistor 69 to the capacitor 66. When the voltage across capacitor 66 is sufficient to render transistor 68 conducting, the supply potential is applied through the collector-emitter path of transistor 68 to the input of the filter 54. This potential is applied to the base of transistor 52 to render the same conducting, the same as when it is held conducting by the voltage from carrier squelch circuit 17. This completes the shunting path to remove the energizing potential form the audio amplifier transistor 40. Accordingly, when the tone signal terminates and the transistor 50 is rendered conducting, the potential applied by transistor 68 to transistor 52 holds this transistor conducting also, to shunt the potential supply to the audio amplifier 40. The transistor 52 will remain conducting for a time depending on the time constant of the capacitor 66 and the resistor 65. When the tone terminates, the transistor 62 is rendered conducting so that the capacitor 66 can discharge through resistor 65 and the collector to emitter path of transistor 62.

Another important feature of the circuit of the invention is the provision for monitoring the channel prior to a transmission. During normal operation, the microphone 24 is placed on hang-up switch 70 which provides a shunt across the collector and emitter electrodes of transistor 52. Accordingly, the carrier squelch circuit 17 cannot enable the amplifier transistor 40, and the audio amPlifier will not be rendered operative until a tone signal is received to render transistor 50 nonconducting. The audio amplifier 40 will normally be disabled because transistor 50 is normally conducting to complete the shunt path to ground which removes the energizing potential from transistor 40. When the coded tone squelch signal is received, transistor 50 is rendered nonconductive to energize the amplifier 40. At the time of initiating a transmission, the operator lifts microphone 24 off hook switch 70, so that the carrier squelch circuit is operative to energize the audio amplifier 40 if there is a carrier wave on the channel. The operator will normally hold the microphone 24 so that the hook switch 70 is open during transmission. This will allow the squelch circuit to operate so that he can hear any communication on the channel. When the operator places the microphone back on the hook switch 70, the switch 70 shunts the collector to emitter path of transistor 52, which immediately deenergizes the audio transistor 40, unless a tone signal is received to open transistor 50. There will be no problem of squelch tail since the audio amplifier is rendered inoperative as soon as the hook switch 70 is operated.

The squelch circuit can also operate a call light circuit to indicate that a call has been received. This is illustrated by box 72 which is connected to the collector of transistor 50, so that a ground is applied to the circuit when transistors 50 and 52 are conducting, and is removed when either transistor is rendered nonconducting. The call light circuit can, therefore, be actuated to energize a lamp in response to removal of the ground when a tone is received. The circuit can hold the lamp energized to indicate that a call has been received until the operator actuates the push-to-talk switch. This causes energization of conductor 33 which is connected to the call light circuit to reset the same.

Figure 2:
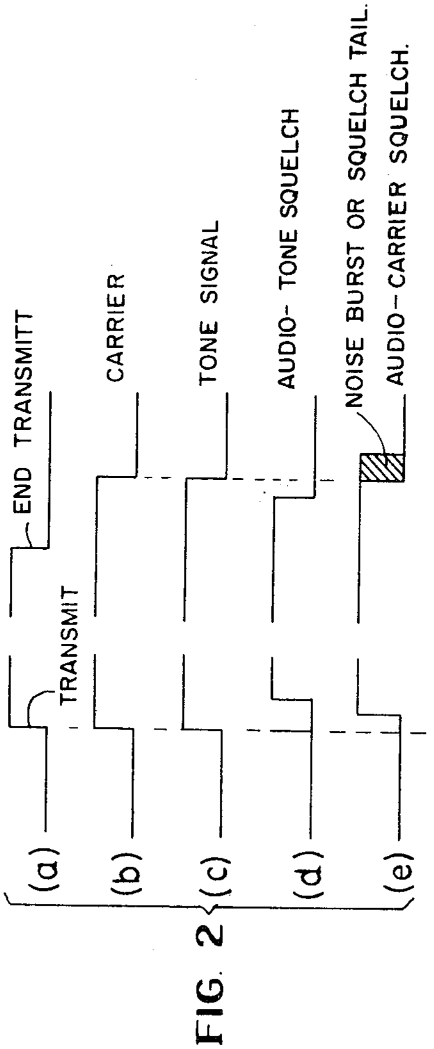
FIG. 2 is a timing diagram illustrating the operation of the squelch system of FIG. 1.

Referring now to FIG. 2, line (a) illustrates the time during which the push-to-talk switch is operated to turn on the transmitter. Line (b) illustrates the time the carrier wave is being transmitted, and ad described above, the turn off of the carrier is delayed after the release of the push-to-talk switch by the delay unit 34. Line (c) illustrates the time the tone signal is transmitted, and this includes both the forward phase for normal operation, and the reverse phase for stopping the mechanically resonant device. LIne (d) illustrates the operation of the tone squelch circuit which is released at the end of the forward phase of the tone, before the carrier terminates. Line (e) shows the time the carrier squelch circuit will tend to hold the audio on, which includes the length of time that the carrier is present and a short additional time required for the carrier squelch circuit to turn off.

The circuit of the invention acts to disable the carrier squelch circuit during the presence of the tone, and for a period of time after the tone terminates. The memory action of the capacitor 66 holds a charge to hold transistor 68 conducting for a period of time after the tone terminates. The circuit as described has been found to be very effective in eliminating the noise burst, or squelch tail, which may be produced by a dual squelch system, at the end of a tone coded squelch operation.

I claim:

1. A squelch control circuit for a receiver which includes a first portion adapted to receive a tone and audio modulated carrier wave and to develop tone and audio signals therefrom, an audio portion coupled to the first receiver portion of reproducing the audio signals and being adapted to be selectively enabled, carrier squelch means coupled to he first receiver portion and responsive to the carrier wave to develop a first control signal, and tone coded squelch means coupled to the first receiver portion and responsive to the tone signal to develop a second control signal, such squelch control circuit controlling the audio portion of the receiver and including in combination, enabling means coupled to the audio portion and having first and second series connected switch portions coupled to the carrier squelch means and to the tone coded squelch means respectively, said enabling means rendering the audio portion of the receiver operative in response to any one of the first and second control signals, and control means coupled to the tone coded squelch means and responsive to the second control signal to develop an inhibit signal, said control means being coupled to said first switch portion of said enabling means and applying said inhibit signal thereto to prevent said enabling means from responding to said first control signal.

2. A squelch control circuit in accordance with claim 1 wherein said first and second switch portions of said enabling means each includes a transistor having output electrodes, and said output electrodes of said transistors of said first and second switch portions are connected in series with each other between the audio portion of the receiver and a reference potential, with said transistors being rendered conductive to provide a shunt path from the audio portion to the reference potential to disable the audio portion.

3. A squelch control circuit in accordance with claim 2 wherein the first control signal renders said transistor of said first switch portion nonconducting to open the shunt path, and said second control signal renders said transistor of said second switch portion nonconducting to open the shunt path.

4. A squelch control circuit in accordance with claim 2 further including switch means connected across said output electrodes of said transistor of said first switch portion.

5. A squelch control circuit in accordance with claim 1 wherein said control means includes capacitor means which is charged in response to said second control signal, and means coupled to said capacitor means for developing said inhibit signal in response to a voltage across said capacitor means which exceeds a predetermined value, said capacitor means retaining a portion of the charge thereon after termination of said second control signal so that said inhibit signal continues for a predetermined period of time after termination of said second control signal.

6. A squelch control circuit in accordance with claim 5 wherein said control means includes a first transistor having output electrodes and being rendered conductive by said second control signal, means including said output electrodes of said first transistor for charging said capacitor means, a second transistor having a control electrode connected to said capacitor means and output electrodes, and means including said output electrodes of said second transistor for developing said inhibit signal and applying the same to said first switch portion of said enabling means.

7. A squelch control circuit in accordance with claim 1 further including call light means coupled to said enabling means and including a lamp energized by said enabling means in response to one of said first and second control signals.

8. A squelch control circuit in accordance with claim 7 wherein said call light means hold said lamp energized, and responds to a reset signal to deenergize said lamp.

* * * * *